United States Patent [19]
Bath et al.

[11] Patent Number: 5,588,230
[45] Date of Patent: Dec. 31, 1996

[54] APPARATUS FOR EXCAVATING SOIL USING A PLURALITY OF INDEPENDENITY PIVOTABLE BRUSHES

[75] Inventors: William R. Bath; Charles R. Yemington, both of Houston, Tex.

[73] Assignee: Sonsub, Inc., Houston, Tex.

[21] Appl. No.: 455,848

[22] Filed: May 31, 1995

[51] Int. Cl.$^6$ .................................................. E02F 3/24
[52] U.S. Cl. ................................. 37/190; 37/189; 15/84
[58] Field of Search ............................... 37/189, 190, 337, 37/398, 341.2, 142.5; 15/83, 84, 85, 86; 193/15, 2 A

[56] References Cited

U.S. PATENT DOCUMENTS

| | | | |
|---|---|---|---|
| 460,476 | 9/1891 | La Due | 15/86 |
| 2,194,297 | 3/1940 | Drumm | 15/83 |
| 2,684,496 | 7/1954 | Lull | 15/83 |
| 3,066,745 | 12/1962 | Smith et al. | 37/189 |
| 3,316,977 | 5/1967 | Snook | 171/25 |
| 3,462,858 | 3/1969 | Francklyn | 37/341 X |
| 3,521,386 | 7/1970 | Francklyn | 37/341 X |
| 4,071,965 | 2/1978 | Lee | 37/4 |
| 4,160,621 | 7/1979 | Bishop | 37/142.5 X |
| 4,163,330 | 3/1979 | Konijn | 37/64 |
| 4,290,820 | 9/1981 | Swishes, Jr. et al. | 37/190 X |
| 4,503,629 | 3/1985 | Uchida | 37/57 |
| 4,549,326 | 10/1985 | Pineau | 15/84 |
| 4,872,977 | 10/1989 | Jackson | 37/337 X |
| 4,914,773 | 4/1990 | Ham | 15/84 X |
| 4,993,498 | 2/1991 | Fresnel | 171/25 |
| 5,084,991 | 2/1992 | Cronk, Jr. | 37/142.5 |
| 5,101,583 | 4/1992 | Scordilis | 37/189 X |
| 5,133,413 | 7/1992 | Baxter | 15/84 X |
| 5,315,770 | 5/1994 | Campbell | 37/190 X |
| 5,361,441 | 11/1994 | Williamson | 15/84 |
| 5,433,032 | 7/1995 | Bath et al. | 37/407 |

FOREIGN PATENT DOCUMENTS

| | | |
|---|---|---|
| 2254870 | 10/1992 | United Kingdom. |
| WO88/03200 | 5/1988 | WIPO. |

Primary Examiner—Terry Lee Melius
Assistant Examiner—Victor Batson
Attorney, Agent, or Firm—Pravel, Hewitt, Kimball & Krieger

[57] ABSTRACT

An apparatus for removing soil and other debris from around buried objects. The apparatus comprises a movable frame which supports plurality of rotatable and independently mounted brushes which are used to gently sweep across the soil to remove soil and other debris from the covered objects. The soil is then transferred to a collection box within the movable frame for subsequent removal. The frame is capable of horizontal, vertical and rotational movement.

14 Claims, 4 Drawing Sheets

APPARATUS FOR EXCAVATING SOIL USING A PLURALITY OF INDEPENDENITY PIVOTABLE BRUSHES

BACKGROUND OF THE INVENTION

1. Field of the Invention

The present invention relates to an apparatus for excavating soil and other debris. More particularly, the present invention relates to an apparatus adapted to be movable in three dimensions and rotatably displaced relative to a vertical axis to remotely excavate soil and other debris covering buried items.

2. Description of the Prior Art

Excavation of soil and other debris to expose sensitive objects is a common problem in many industries, particularly when hazardous waste material is being excavated (such as buried drums) or a natural gas pipeline or fiber optic telephone cables need to be uncovered. It is a primary concern, in these events, to uncover the object without damaging it. The conventional approach typically is to excavate with a backhoe tractor or similar device until a majority of the soil and other debris has been removed. At that point, manual labor is used to remove the remaining soil around the unearthed object. Unfortunately, it is not uncommon for laborers to accidentally damage the object with a shovel or similar implement before it is fully unearthed.

Therefore, the need exists for an improved apparatus for excavating buried objects which minimizes the opportunity for damage to the object being unearthed.

SUMMARY OF THE INVENTION

The present invention relates to an invention for removing soil and other debris around buried objects. The apparatus comprises a movable frame which supports a collection box in which the excavated soil is placed during the unearthing operation. The apparatus also includes a plurality of brushes which are rotatably mounted for independent pivotal movement about one end of the movable frame structure. A conveyor system is used to displace the soil and other debris removed by the brushes into the collection box. An interfacing device may be used which assists in collecting the soil from the brush and guide the soil and other debris onto the conveyor system.

The apparatus also includes means for raising and lowering the frame and rotating it relative to a vertical axis. In this manner, the apparatus may be lowered and rotated within four degrees of freedom to a precise location at the top of a soil bed for excavation. To accomplish such a gantry frame is used which includes motor means for raising and lowering the movable frame and rotating it relative to a vertical axis.

BRIEF DESCRIPTION OF THE DRAWINGS

In order to more fully understand the drawings referred to in the detailed description of the preferred invention, a brief description of each drawing is provided.

DETAILED DESCRIPTION OF PRESENT INVENTION

Figure 1:
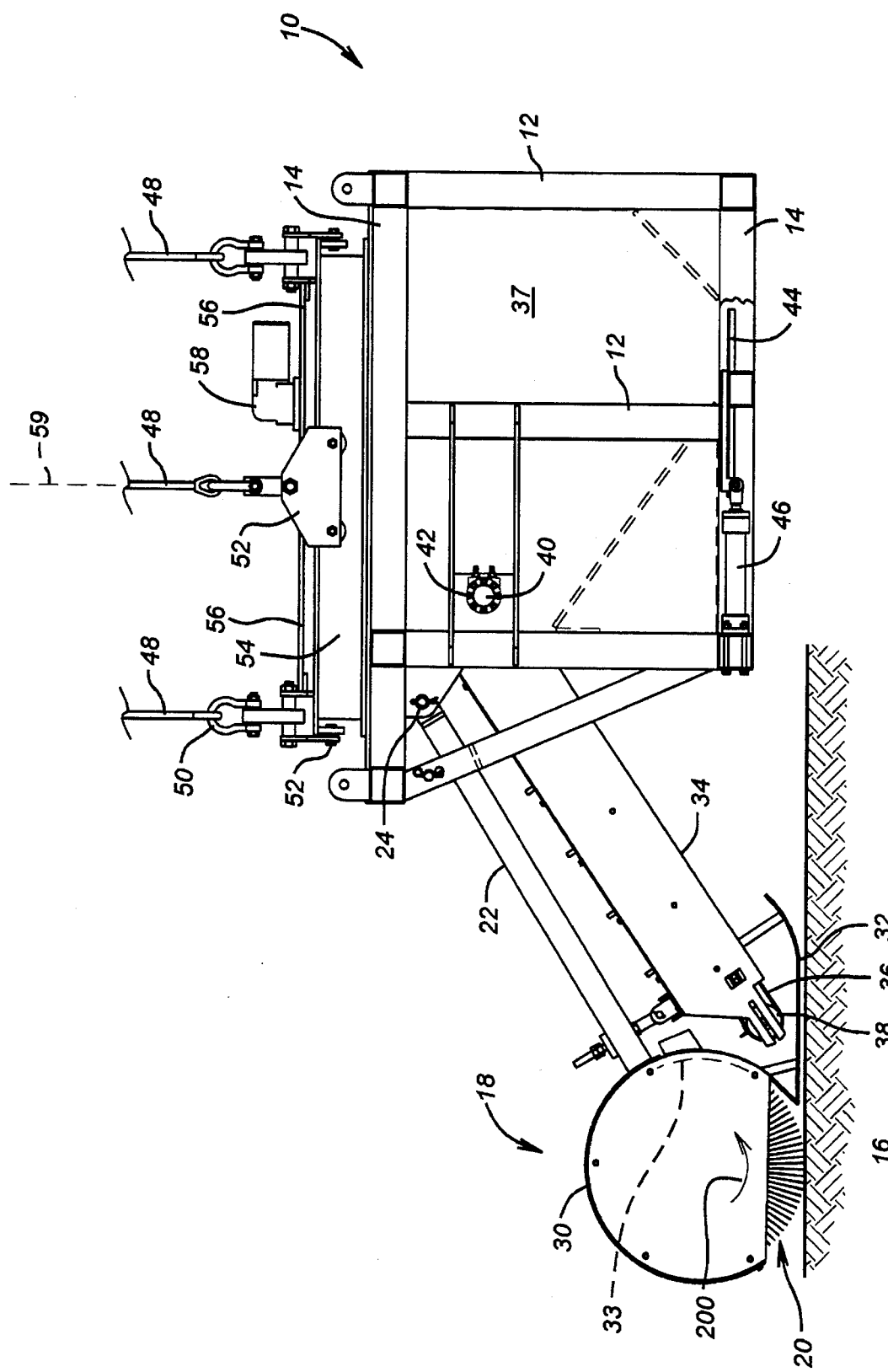
FIG. 1 is an elevation view of the present invention.
Figure 2:
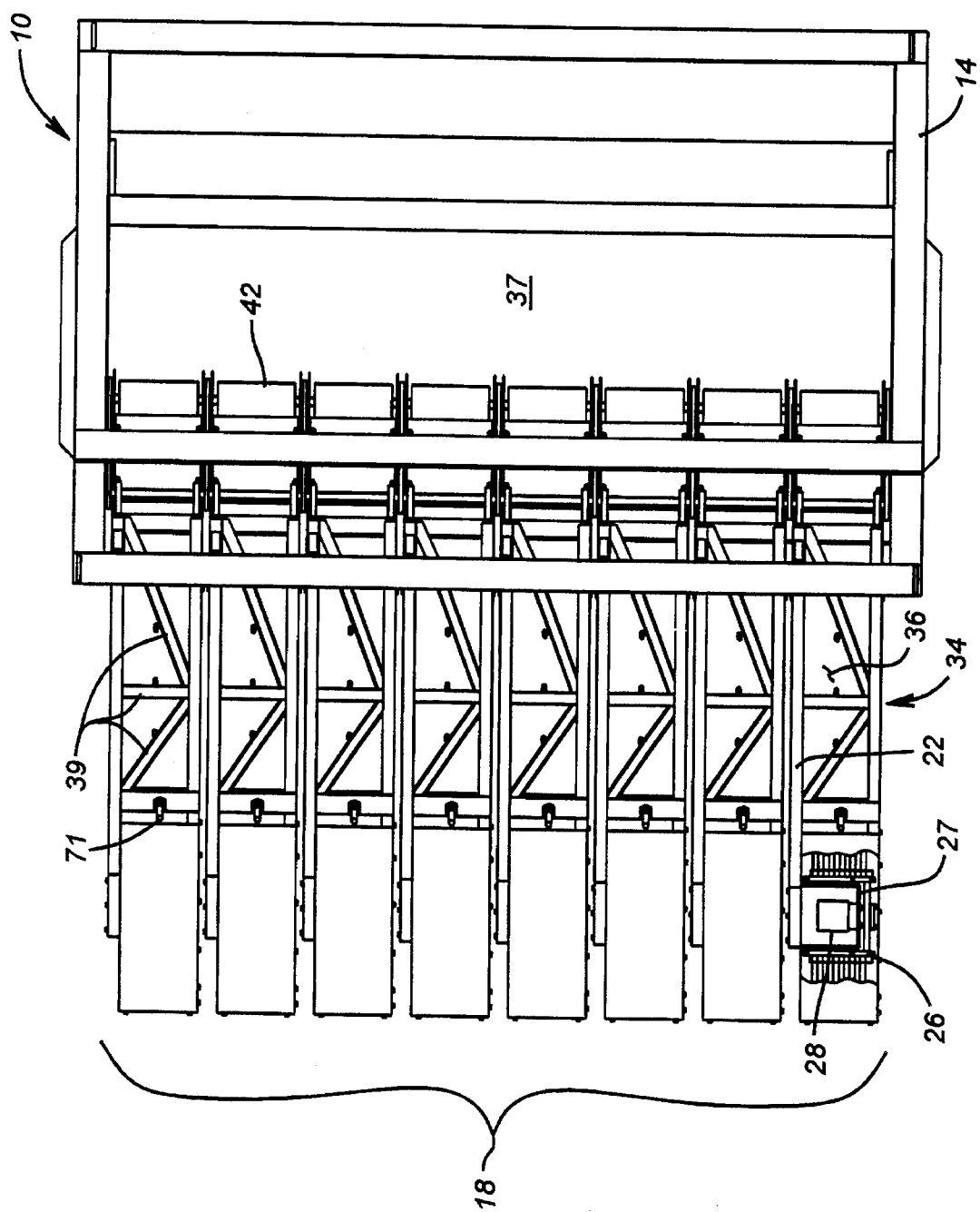
FIG. 2 is a plan view of the present invention.

Referring to FIGS. 1 and 2, the present invention comprises a movable frame 10 composed of vertical members 12 and horizontal members 14. Frame 10 is adapted to be supported above ground 16 for removal of soil and other debris. A sweeping system 18 is comprised of a plurality of brushes 20 which are each independently mounted to an arm 22. Each arm 22 is pivotally attached at one end 24 to frame 10. Each brush 20 is supported on a cylindrical hub 27 which is integrally mounted to each arm 22. A bushing 26 is included which provides for relative movement between each brush 20 and its hub 27. Each hub 27 is driven by a hydraulic motor 28, or equivalent motor system. Further, each brush 20 is shrouded by a housing 30 which is also attached to a corresponding arm 22. Each housing 30 serves to prevent damage to the brush or other equipment, to protect personnel from the brushes, and to contain the airborne debris.

The present invention includes a collection hopper or box 37 mounted within frame 10. Collection box 37 serves to provide temporary storage for the soil and other debris removed in accordance with the present invention. A conveyor system 34 is provided having a frame structure 39 supporting a conveyor belt 36 for each brush 20. Each conveyor system 34 is also pivotally attached to frame 10. Each conveyor belt 36 rotates about two trunnions 38 and 40, and each conveyor belt 36 is displaced by a hydraulic motor 42, or equivalent, which serves to rotate trunnion 40.

The present invention also includes an interface device 32 for each brush 20. Each interface device 32 includes a screen or mesh 33. Mesh 33 serves to limit the maximum size of soil (or debris) particles allowed to be removed by the present invention. Each interface device 32 also serves to guide the soil and other debris onto its respective belt 36. Removed soil, or other debris collected, is periodically discharged from collection box 37 through a power operated discharge door 44 which is located proximate the bottom of frame 10 near bottom horizontal members 14. Door 44 is displaced horizontally by hydraulic cylinder 46. Thus, as described further below, activation of cylinder 46 at periodic intervals permits the discharge or release of all debris collected from box 37 at a specific disposal location.

The present invention also includes a system to raise and lower frame 10 relative to ground 16 and to rotate frame 10 about a vertical axis. Vertical movement is provided through cables 48 which are connected at one end through clevises 50 and roller arrangements 52 to a ring 54. Ring 54 is fixed to the top of frame 10. All roller arrangements 52 are interconnected through a horizontal plate 56 which serves as a swivel. Motor 58 is attached to plate 56 and also engages ring 54. In this manner, activation of motor 58 causes relative rotation of plate or swivel 56 (and thereby rollers 52) relative to ring 54. Thus, by activating motor 58, frame 10 can be rotated relative to swivel 56 and cables 48 about vertical axis 59.

The amount of soil removed can be controlled by preselection of the stiffness of the brush bristles and by adjusting the speed of motors 28 which rotate the brushes 20. Additionally, the load of the brushes on the top of the soil is variable by adding or removing weight to the overall cantilever arrangement of each brush 20/arm 22.

Figure 3:
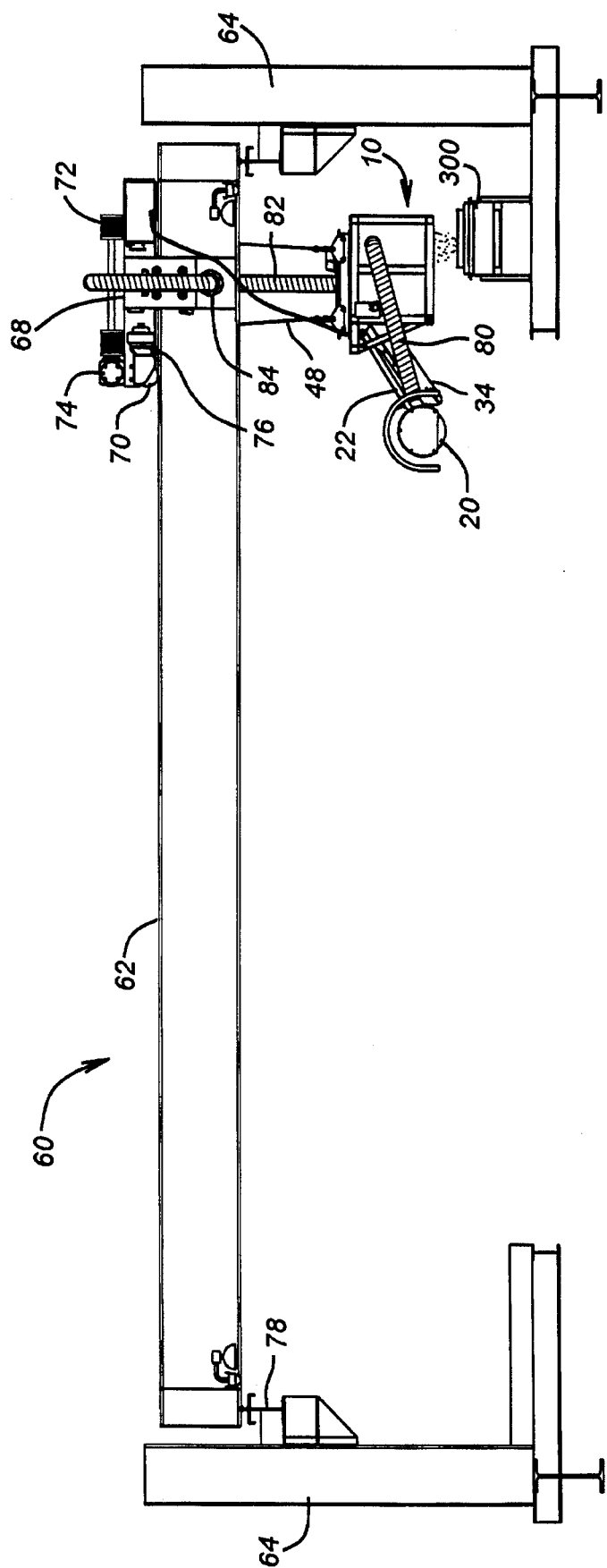
FIG. 3 is another elevation view of the present invention.
Figure 4:
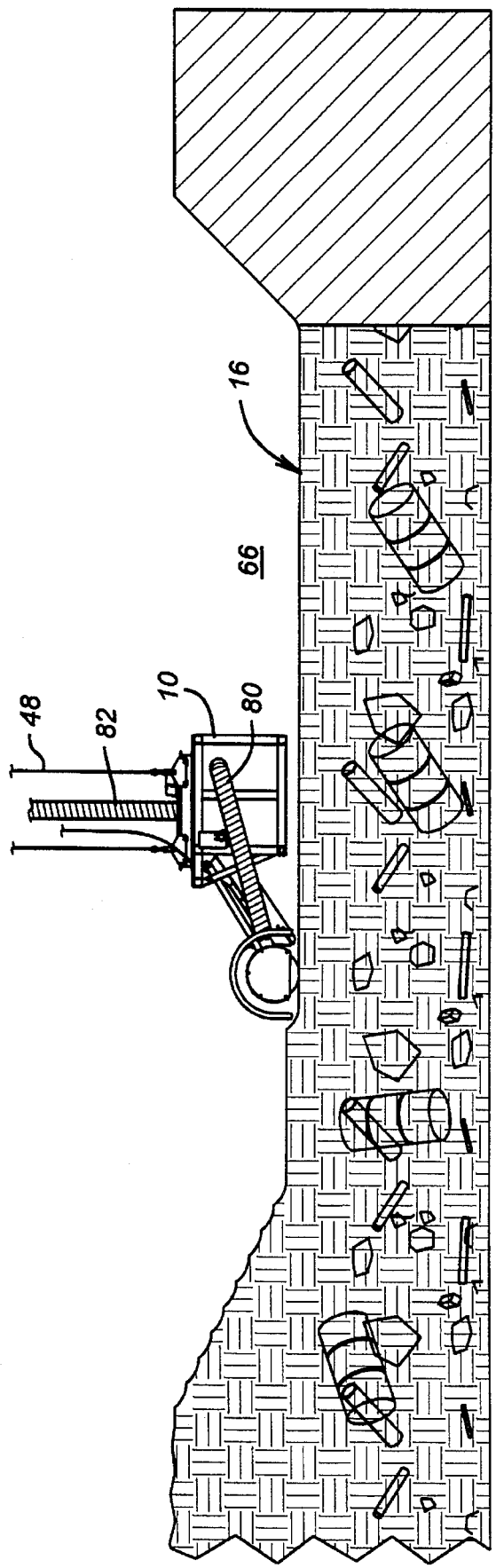
FIG. 4 is yet another elevation view of the present invention above an excavation site.

Referring now to FIGS. 3 and 4, a gantry arrangement 60 is shown comprising a horizontal beam 62 supported by columns 64 situated above an excavation site 66. A cart 68 having rollers 70 is adapted to move in a horizontal direction across beam 62 above excavation site 66. Cart 68 supports a spool arrangement 72 on which cables 48 wind and unwind. Motor 74 is used to rotate spool arrangement 72 to raise and lower frame 10 relative to ground 16. Motor 76 is used to power rollers 70 providing horizontal movement along beam 62.

Beam 62 is supported on column 64 through endcaps 78. It may be desirable to move beam 62 along endcaps 78 thereby horizontally displacing frame 10 in a plane perpendicular to FIG. 3.

In this manner, displacement of cart 68 along beam 62 in the plane of FIG. 3, displacement of beam 62 along endcaps 78 in a plane perpendicular to FIG. 3, and lowering of cables 48 by means of motor 74/spool arrangement 72 provides for the movement of brushes 20/frame 10 in three degrees of freedom. Thus, in an excavation, brushes 20 may be lowered and positioned at any point along an excavation site 66. Obviously, other means may be used to move frame 10 in three degrees of freedom other than a gantry arrangement 60 without departing from the spirit of the invention. For example, a traditional crane may be used which supports frame 10 from its cables 48 which would be the primary hoisting cable arrangement of the crane. Otherwise, the operation of frame 10 would be identical.

Referring still to FIGS. 3 and 4, the present invention also includes a system for collecting airborne debris generated as a result of the brushing activity of brushes 20. A first hose 80 extends from each housing 30 of each brush to the collection box 37. Hose 80 may include a manifold arrangement which reduces the number of inlets of hose 80 at collection box 37 to a single connection. A second hose 82 extends from the collection box 37 upwardly to the cart 72. Mounted on cart 72 is an air filter/power fan arrangement 84 adapted to draw a vacuum through hoses 82, 80 within each housing 30. In this manner, dust and other airborne soils and debris generated as a result of the brushing activity described herein are removed from the site with a minimal amount of airborne residual. If a crane were used instead of a gantry arrangement 60, the crane would include a platform or similar base near the end of its boom to support the air filter/power fan arrangement 84 consistent with the disclosure set forth herein.

In the operation of the present invention, gantry arrangement 60 is installed above an excavation site 66. Cart 68 is positioned above the site where excavation is to begin. Preferably, frame 10 is advanced in a horizontal direction in the plane of FIGS. 3 and 4.

Frame 10 is first lowered by means of cables 48 until brushes 20 gently engage the top surface of the soil 16. Individual motors 28 are initiated rotating each brush 20 preferably in the direction of arrow 200 (See FIG. 1). Alternatively, each brush may be rotated in the direction opposite arrow 200 if desirable. In that event the soil is swept up over each brush and onto the interface device 32. The soil is confined as it is swept over each brush by housing 30.

Individual motors 42 are also activated powering each conveyor belt 36. Concurrently, fan motor 84 is initiated which draws a vacuum through hoses 80/82 back to each housing 30. At that point, motor 74 is activated slowly advancing cart 68 in a horizontal direction along beam 62 as shown in FIG. 3. The individual brushes 20 are thereby permitted to pivot about individual arms 22 on a selected basis, gently removing soil which is passed through interface 32 onto conveyors 36 and into collection box 37. Since a plurality of brushes are used which are independently mounted to frame 10, each brush may conform to the individual topography at the particular spot on the site being excavated. In this manner, the brushes 20 will insure a smooth and consistent removal of soil without interference or influence by the adjacent brushes.

Periodically, it is necessary to empty box 37. At that time, cables 48 are used to lift frame 10 and cart 68 is advanced to a site having a container 300 (see FIG. 3). Door 44 of frame 10 is positioned over container 300, and cylinder 46 is activated opening door 44 thereby permitting the emptying of collection box 37. Door 44 is then closed and frame 10 is returned to its original location on the excavation site 66 so that soil removal may continue.

Periodically, it may be necessary to rotate frame 10 relative to beam 62. In such event, motor 58 is activated, thereby rotating swivel 56 relative to ring 54. Since cables 48 include rollers 52 and are fixed relative to beam 62, motor 58 permits the rotation of ring 54 relative to rollers 52 enabling the rotational relocation of frame 10 relative to beam 62.

In this manner, an apparatus is provided which can be remotely operated to remove soil, including airborne debris, from an excavation site. Relative movement is provided in four degrees of freedom (x, y and z axes, and rotational movement relative to a vertical axis).

Thus, it is possible for the apparatus to accommodate varying topography at the excavation site with the maximum degree of operability to position frame 10 within any particular orientation and continue the excavation. Since the present invention permits movement of frame 10 in four degrees of freedom it can be positioned at any location and in any orientation at an excavation site.

The description given herein is intended to illustrate the preferred embodiment of the present invention. It is possible for one skilled in the art to make various changes to the details of the application without departing from the spirit of the invention. Therefore, it is intended that all such variations be included within the scope of the present invention as claimed.

What is claimed is:

1. An apparatus for removing soil comprising:

a frame;

a collection box supported within said frame;

means for sweeping soil pivotally attached to said frame, said sweeping means comprising a plurality of brushes rotatably mounted and each said brush mounted for independent vertical positioning; and means for conveying the soil from said sweeping means into said collection box.

2. The apparatus according to claim 1 wherein said sweeping means further comprises:

a plurality of arms, each of said arms having a first end and a second end, each of said first ends pivotally attached to said frame and one said brush rotatably mounted to said second end of each said arm, wherein each said arm is independently pivotal in a vertical plane and each said brush is independently rotatable about a horizontal axis.

3. An apparatus for removing soil comprising:

a movable frame;

a collection box supported within said movable frame;

means for sweeping soil, said sweeping means comprising:

plurality of arms pivotally attached to said movable frame; and a plurality of brushes, one said brush rotatably mounted to each said arm, wherein each said arm is independently pivotal in a vertical plane and each said brush is independently rotatable about a horizontal axis;

means for conveying said soil from said sweeping means into said collection box; and means for moving said movable frame in a vertical and horizontal direction and rotatably relative to said vertical direction.

4. The apparatus according to claim 3 wherein said sweeping means further comprises:

means for guiding soil from each said brush onto said conveying means.

5. The apparatus according to claim 3 wherein said apparatus further comprises means for removing soil from said collection box.

6. The apparatus for removing soil comprising:

a movable frame;

a collection box supported within said movable frame;

means for sweeping soil, said means being pivotally attached to said movable frame;

means for conveying said soil from said sweeping means into said collection box;

a gantry frame;

a displaceable cart adapted to move along said gantry frame in a horizontal direction and support said movable frame;

cable means suspended from said cart for displacing said movable frame in a vertical direction;

motor means mounted on said cart for displacing said cart in said horizontal direction and for winding and unwinding said cable means;

a swivel mounted to the top of said movable frame; and means for engaging said swivel and rotating said movable frame relative to said swivel.

7. The apparatus according to claim 6 wherein said apparatus further comprises means for collecting airborne debris generated by said sweeping means.

8. The apparatus according to claim 7 wherein said collecting means comprises at least one first hose extending from said sweeping means to said collection box.

9. The apparatus according to claim 8 wherein said collection means further comprises a second hose extending from said collection box to said cart and means for drawing a vacuum through said first and second hoses.

10. The apparatus according to claim 6 wherein said apparatus further comprises means for removing soil from said collection box.

11. An apparatus for removing soil comprising:

a movable frame;

a collection box supported within said movable frame;

means for sweeping soil, said means being pivotally attached to said movable frame;

means for converting said soil from said sweeping means into said collection box; and means for moving said movable fatten in a vertical and horizontal direction and rotatably relative to said vertical direction, said moving means comprising:

a gantry frame;

a displaceable cart adapted to move along said gantry frame in said horizontal direction and support said movable frame;

cable means suspended from said cart for displacing said movable frame in said vertical direction;

motor means mounted on said cart for displacing said cart in said horizontal direction and for winding and unwinding said cable means;

a swivel mounted to the top of said movable frame; and means for engaging said swivel and rotating said movable frame relative to said swivel.

12. The apparatus according to claim 11 wherein said apparatus further comprises means for collecting airborne debris generated by said sweeping means.

13. The apparatus according to claim 12 wherein said collecting means comprises at least one first hose extending from said sweeping means to said collection box.

14. The apparatus according to claim 13 wherein said collection means further comprises a second hose extending from said collection box to said cart and means for drawing a vacuum through said first and second hoses.

* * * * *

UNITED STATES PATENT AND TRADEMARK OFFICE
CERTIFICATE OF CORRECTION

PATENT NO.  :   5,588,230
DATED       :   December 31, 1996
INVENTOR(S) :   William R. Bath; Charles R. Yemington It is certified that error appears in the above-identified patent and that said Letters Patent is hereby corrected as shown below:

Column 5, line 19, "The" should be --An--.

Column 6, line 15, "converting" should be --conveying--.

Signed and Sealed this

First Day of April, 1997

Attest:

BRUCE LEHMAN

Attesting Officer    Commissioner of Patents and Trademarks